US010620371B2

(12) United States Patent
Dumais et al.

(10) Patent No.: US 10,620,371 B2
(45) Date of Patent: Apr. 14, 2020

(54) WAVEGUIDE CROSSING HAVING RIB WAVEGUIDES

(71) Applicants: Huawei Technologies Canada Co., Ltd., Ottawa (CA); The Governing Council of the University of Toronto, Toronto (CA)

(72) Inventors: Patrick Dumais, Ottawa (CA); Wesley David Sacher, Mississauga (CA)

(73) Assignees: Huawei Technologies Canada Co., Ltd., Kanata (CA); The Governing Council of the University of Toronto, Toronto (CA)

( * ) Notice: Subject to any disclaimer, the term of this patent is extended or adjusted under 35 U.S.C. 154(b) by 0 days.

(21) Appl. No.: 15/062,091

(22) Filed: Mar. 5, 2016

(65) Prior Publication Data

US 2017/0254951 A1 Sep. 7, 2017

(51) Int. Cl.
*G02B 6/125* (2006.01)
*G02B 6/12* (2006.01)
*G02B 6/136* (2006.01)
*G02B 6/122* (2006.01)

(52) U.S. Cl.
CPC ......... *G02B 6/125* (2013.01); *G02B 6/12002* (2013.01); *G02B 6/136* (2013.01); *G02B 6/1228* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| 5,109,464 | A  | * | 4/1992 | Munowitz | G02B 6/30 385/130 |
| 6,408,126 | B1 | * | 6/2002 | Hoekstra | G02B 6/125 385/130 |
| 6,674,950 | B2 | * | 1/2004 | Yang     | G02B 6/12004 385/129 |
| 6,876,050 | B2 | * | 4/2005 | Morse    | H01L 29/92 257/432 |

(Continued)

FOREIGN PATENT DOCUMENTS

| CN | 102944912 B | | 4/2014 | |
| JP | 05072427 A | * | 3/1993 | ............... G02B 6/12 |
| WO | 2004099834 A2 | | 11/2004 | |

OTHER PUBLICATIONS

Kurczveil et al., "Characterization of insertion loss and back reflection in passive hybrid silicon tapers," IEEE Photonics Journal, vol. 5, No. 2, p. 6600410, 2013.

(Continued)

*Primary Examiner* — Tina M Wong

(57) ABSTRACT

A photonic platform includes a substrate, a buried oxide layer on the substrate, a first optical layer on the buried oxide layer, the first optical layer including one or more waveguides shaped as rib waveguides protruding upwardly from a common underlying slab and a second optical layer spaced above the first optical layer, the second optical layer defining an upper waveguide that crosses over the one or more partially etched waveguides. A low-loss photonic switch may be made using a silicon photonic platform implementing this waveguide crossing.

18 Claims, 6 Drawing Sheets

(56) References Cited

U.S. PATENT DOCUMENTS

| | | | | |
|---|---|---|---|---|
| 6,950,577 | B2* | 9/2005 | Liu | G02B 6/124 385/129 |
| 7,251,406 | B2* | 7/2007 | Luo | G02B 6/1228 385/129 |
| 7,454,102 | B2* | 11/2008 | Keyser | G02B 6/12 385/129 |
| 7,515,793 | B2* | 4/2009 | Dehlinger | G02B 6/12004 385/129 |
| 7,555,173 | B2* | 6/2009 | Barrios | G02F 1/025 385/14 |
| 7,672,558 | B2* | 3/2010 | Keyser | G02B 6/122 385/129 |
| 8,098,968 | B2* | 1/2012 | Green | B82Y 20/00 385/1 |
| 8,532,440 | B2* | 9/2013 | Ushida | G02F 1/025 385/131 |
| 8,866,187 | B2* | 10/2014 | Na | H01L 31/02327 257/184 |
| 8,883,080 | B2* | 11/2014 | Packirisamy | B82Y 20/00 385/12 |
| 9,002,144 | B2* | 4/2015 | Fujikata | G02F 1/025 385/132 |
| 9,041,492 | B2* | 5/2015 | Wang | H03H 3/0072 310/324 |
| 9,411,099 | B2* | 8/2016 | Mizutani | G02B 6/1228 |
| 9,465,186 | B2* | 10/2016 | Yan | G02B 7/022 |
| 2003/0067676 | A1* | 4/2003 | Wang | B82Y 20/00 359/344 |
| 2004/0033016 | A1* | 2/2004 | Kropp | G02B 6/30 385/31 |
| 2005/0110108 | A1* | 5/2005 | Patel | G02B 6/12004 257/453 |
| 2008/0069491 | A1* | 3/2008 | Kissa | G02F 1/0123 385/2 |
| 2010/0322559 | A1* | 12/2010 | Ogawa | G02B 6/124 385/37 |
| 2011/0296726 | A1* | 12/2011 | Rinko | B32B 38/06 40/561 |
| 2012/0250007 | A1* | 10/2012 | Na | G01M 11/00 356/73.1 |
| 2015/0247974 | A1* | 9/2015 | Painchaud | G02B 6/305 385/14 |
| 2017/0003451 | A1* | 1/2017 | Ma | G02B 6/125 |

OTHER PUBLICATIONS

Jones et al., "Layer Separation Optimization in CMOS Compatible Multilayer Optical Networks," Optical Interconnects Conference Paper TuD3 (Oral), 2013.

Jones et al., "Ultra-low crosstalk, CMOS compatible waveguide crossings for densely integrated photonic interconnection networks," Optics Express, vol. 21, No. 10, p. 12002, 2013.

Sacher,W. et al. Multilayer Silicon Nitride-on-Silicon Integrated Photonic Platforms and Devices. Feb. 15, 2015.

Huang. Y. et al. CMOS compatible monolithic Si3N4-on_SOI platform for low-loss high performance silicon photonics dense integration Optics Express. Sep. 8, 2014. pp. 1-7.

Jones, A. et al. Ultra-low crosstalk, CMOS compatible waveguide crossings for densely integrated photonic interconnection networks. May 20, 2013. pp. 1-13.

Chen L. et al. Compact, low-loss and low-power 8×8 broadband silicon optical switch Optics express. Aug. 13, 2012. pp. 1-9.

International Search Report for PCT/CA2016/050514 dated Nov. 30, 2016.

Alonso-Ramos C et al., "Single-etch grating coupler for micrometric silicon rib waveguides", Optics Letters, vol. 36, No. 14, Jul. 15, 2011, pp. 2647-2649, XP001564129.

* cited by examiner

WAVEGUIDE CROSSING HAVING RIB WAVEGUIDES

TECHNICAL FIELD

The present disclosure relates generally to photonic circuits and platforms and, more particularly, to waveguide crossings.

BACKGROUND

Silicon photonics is an emerging technology that enables fabrication of fast, low-cost and high-density photonic devices for a variety of uses and applications, notably in relation to optical network switching. Photonic switch fabrics, which are capable of switching optical signals without conversion to the digital domain, are an area of particular interest.

A silicon photonic switch typically incorporates a number of optical waveguides of varying lengths, multiple optical switch cells, and multiple waveguide crossings having intersecting waveguides.

A silicon photonic device, such as a silicon photonic switch, can be fabricated using a commercially available "silicon-on-insulator" (SOI) wafer composed of a thin layer of silicon (typically 150-350 nm thick) disposed on a layer of buried oxide (e.g. silicon dioxide) which is, in turn, supported on a silicon substrate typically several hundred micrometers thick. The fabrication of photonic devices requires a number of steps that include, for example, chemical vapor deposition and patterning of layers to form waveguides using lithography and etching.

The commercially viable implementation of a silicon photonic switch fabric imposes demanding requirements in terms of optical performance (e.g. insertion loss, crosstalk) and optical component density. In a silicon photonic switch matrix, the insertion loss can be attributed primarily to a small number of sources: fiber-to-integrated-circuit coupling loss, waveguide scattering loss, switch cell insertion loss, and waveguide crossing loss. Waveguide crossings are necessary in switch fabrics. In large switch fabrics, there may be a significant number of waveguide crossings which cause losses and crosstalk. In silicon photonics, the waveguide scattering loss is relatively high, i.e. approximately 2 dB/cm for strongly confining strip waveguides. In a large switch matrix, therefore, long optical paths can cause a large scattering loss to accumulate, and many crossings can cause crosstalk to accumulate.

There is accordingly a need in silicon photonics for lower loss and low crosstalk yet broadband waveguide crossings which enable different parts of a large-scale photonic circuit to be interconnected.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present specification discloses a low-loss photonic platform or "material stack" that includes an upper waveguide crossing over partially etched waveguides. This dual-layer waveguide crossing is formed by two spaced-apart optical layers. The first (lower) optical layer is deposited on a buried oxide layer supported in turn by an inactive silicon layer or equivalent. Formed in this first optical layer are a plurality of partially etched rib waveguides. In the context of this specification, a rib waveguide is composed of a strip (or "rib") of high-index material protruding from a layer of the same material, the whole structure being embedded in a material or materials having a lower refractive index. The low-lying portion of the high-index material, which may or not be fully etched at a certain distance from the rib, is referred to as the slab. Spaced above this first (lower) optical layer is a second (upper) optical layer. The second optical layer defines an upper waveguide that traverses (i.e. crosses over) the rib waveguides of the first optical layer. The rib waveguides protrude upwardly from a common, underlying continuously formed silicon slab. This low-loss waveguide crossing is particularly suitable for photonic switches.

One inventive aspect of the disclosure is a photonic platform that includes a substrate, a buried oxide layer on the substrate, a first optical layer on the buried oxide layer, the first optical layer including a slab and one or more rib waveguides protruding upwardly from the slab and a second optical layer spaced above the first optical layer, the second optical layer defining an upper waveguide that crosses over the one or more rib waveguides.

Another inventive aspect of the disclosure is a photonic switch that includes a lower optical layer disposed on a buried oxide layer supported by a substrate, the lower optical layer having one or more lower partially etched waveguides that form one or more rib waveguides on a common slab and an upper optical layer having an upper waveguide that traverses the one or more lower partially etched waveguides.

Yet another inventive aspect of the disclosure is a photonic waveguide crossing having a lower optical layer in which is formed a lower rib waveguide and an upper optical layer in which is formed an upper waveguide, the upper optical layer being disposed above the lower optical layer.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without certain specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Various embodiments are now described with reference to the drawings. It will be appreciated that the photonic platforms ("material stacks") shown in the figures are not drawn to scale and that the relative thicknesses, heights, widths or other dimensions of the layers or other components may be varied from what is shown in the figures.

Figure 1:
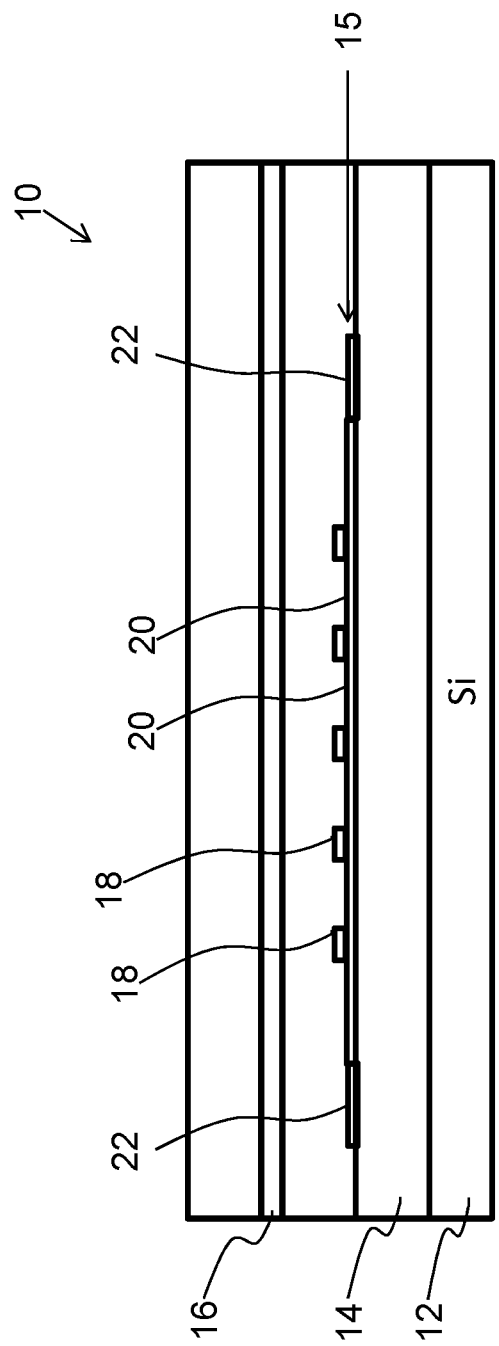
FIG. 1 is a side view of a photonic platform in accordance with an embodiment of the present invention.
Figure 2:
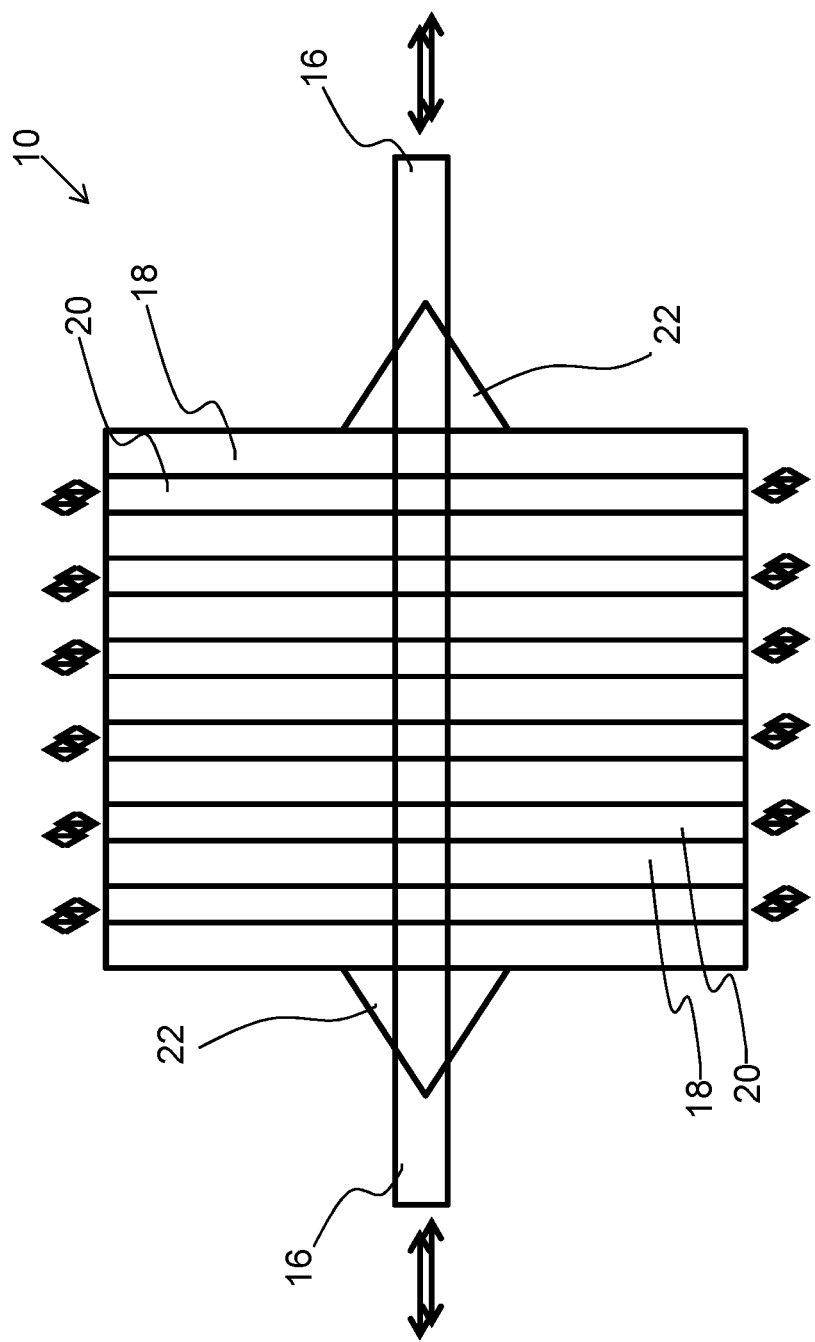
FIG. 2 is a top view of the photonic platform of FIG. 1.

In the embodiment depicted by way of example in FIGS. 1 and 2, a photonic platform denoted generally by reference numeral 10 may include a silicon (Si) substrate 12 supporting a buried oxide layer 14 which may be formed of silica ($SiO_2$) or any equivalent insulating material having a suitably low refractive index. In other embodiments, the substrate 12 supporting the buried oxide layer 14 may be formed of another suitable material.

The platform 10 includes a first (lower) optical layer 15 deposited on the buried oxide layer 14 and a second (upper) optical layer 16 spaced above the first (lower) optical layer 16. The first (lower) optical layer 15, which is also referred to as an active silicon layer, is an optical transport layer capable of conducting light. This first optical layer, which may be made of silicon or equivalent light-transmitting material, is said to be "active" as it actively transports light unlike the (passive) silicon substrate 12 which does not transport light. The first optical layer 15 includes a silicon slab 18 and a plurality of rib waveguides 20 protruding upwardly from the common underlying slab 18. The slab 18 is common to the rib waveguides 20 as it underlies all of the rib waveguides 20. The slab 18 is said to be continuous in the sense that the slab 18 extends completely from one of the rib waveguides 20 to an adjacent one of the rib waveguides 20. In the embodiment illustrated by way of example in FIGS. 1 and 2, there are six silicon rib waveguides 20; however, it will be appreciated other embodiments may have a different number of rib waveguides 20. The silicon slab 18 and the rib waveguides 20 may be formed in the first optical layer 15 by partially etching the first optical layer 15 such that the rib waveguides 20 have a greater height than the slab 18. In one specific example, the rib waveguides are 220 nm in height whereas the slab is 90 nm in height. As illustrated by way of example in FIG. 2, each rib waveguide 20 is narrower than the expanse of slab 18 between adjacent rib waveguides 20. It bears emphasizing that these dimensions are only presented as one specific implementation. The dimensions and proportions may vary in other embodiments.

In the embodiment shown by way of example in FIGS. 1 and 2, the second (upper) optical layer 16 defines an upper waveguide that traverses or crosses over the plurality of rib waveguides 20. The upper waveguide formed by the upper optical layer 16 may be substantially orthogonal to the plurality of rib waveguides 20 that lie underneath the upper optical layer 16. An orthogonal crossing (i.e. a crossing angle of 90 degrees) may lessen crosstalk; however, a non-orthogonal crossing angle may still be used in other embodiments.

In the illustrated embodiments, the rib waveguides 20 are parallel to each other and are also equally spaced apart although it will be appreciated that in other embodiments the rib waveguides 20 may not be parallel and/or may not be equally spaced apart. In the illustrated embodiments, the rib waveguides 20 are equally thick (wide) and equally high although in other embodiments the rib waveguides 20 may not be of identical thickness and/or of identically high.

The second (upper) optical layer 16 in one embodiment is made of silicon nitride (hereinafter denoted "SiN" although it will be appreciated that the SiN may be mainly of the form of $Si_xN_y$, including stoichiometric silicon nitride, $Si_3N_4$). Although silicon nitride performs well as the upper waveguide layer, another light-propagating material with suitable optical properties can be substituted. By way of a non-limiting example, the light-propagating material may include metal oxides, such as $TiO_2$, $ZrO_2$ and $Ta_2O_5$, since they have similar refractive indices to silicon nitride around the wavelengths of 1310 nm and 1550 nm, as well as a high optical transparency at those wavelengths. Thus, the upper waveguide layer may be made of silicon nitride or another suitable material such as, for example, $TiO_2$, $ZrO_2$ and $Ta_2O_5$. In some embodiments, the upper waveguide formed in the second (upper) optical layer 16 has a refractive index +/−20% of the refractive index of silicon nitride. For example, silicon oxynitride may be used in some instances.

The layers of silicon nitride, silicon and silica may be deposited on the SOI wafer using various existing CMOS-compatible fabrication techniques, e.g. chemical vapor deposition (CVD), lithography and etching. Layers may be deposited onto the SOI wafer using front-end-of line (FEOL) processes to form a FEOL layer stack or back-end-of-line (BEOL) processes to form a BEOL layer stack.

In the embodiment shown by way of example in FIGS. 1 and 2, the photonic platform 10 includes optional tapers (or tapered transitions) 22 formed in the first (lower) optical layer 15. These tapered transitions 22 extend laterally outwardly from the slab 18. These tapered transitions 22 may be aligned with the upper waveguide 16 as shown in FIGS. 1 and 2. The tapered transitions 22 reduce the optical loss at the crossing. In the embodiment depicted by way of example in FIGS. 1 and 2, the tapered transitions 22 are triangular. As shown, the tapered transitions 22 may be in the form of an isosceles triangle, i.e. a symmetrical triangle having two equal sides.

The photonic platform 10 may include other elements or components that are not shown in the figures such as, for example, a heater, contacts and vias. The photonic platform may also include photodiodes and/or PN junctions.

Figure 3:
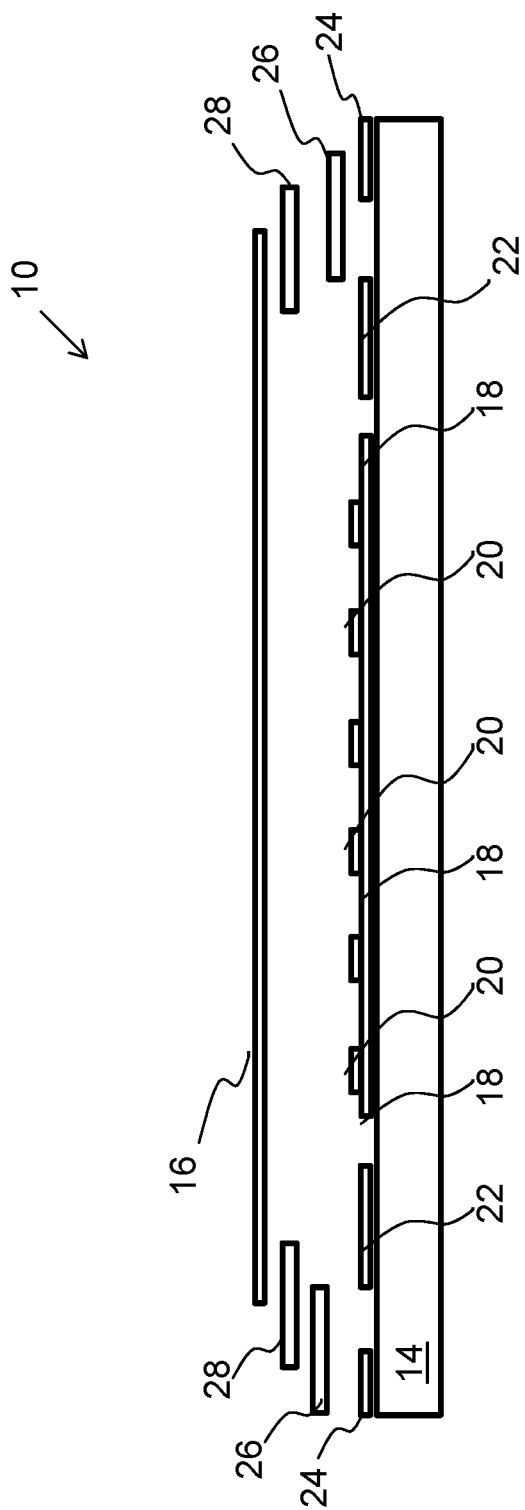
FIG. 3 is a side view of the photonic platform depicting interlayer transitions.

In the embodiment shown by way of example in FIG. 3, the photonic platform 10 may include first and second lateral silicon waveguides 24 in the first (lower) optical layer 15. The lateral silicon waveguides 24 are spaced laterally from the tapered transitions 22 as shown. Light is coupled upwardly from one of the lateral silicon waveguides 24 through one or more intermediate optical layers 26, 28 to the upper waveguide of the upper optical layer 16 where it traverses the rib waveguides 20 with acceptably low loss. The intermediate optical layers 26, 28 include first and second intermediate waveguides, respectively, for optically coupling the first and second lateral waveguides 24 of the first optical layer 15 to the respective opposite ends of the upper waveguide 16. The light is then coupled back down to the other of the lateral silicon waveguides 24 through the one or more intermediate optical layers 26, 28. As such, these optical transport layers act as steps, each disposed a different depth, that cause the light to ascend to a higher level or to descend to a lower level. This arrangement of step-like levels thus enables vertical transmission of light, thereby functioning to some extent like an optical via. This technology can be exploited to efficiently conduct light over one or more waveguides. In other words, the step-like layers can be used to construct a low-loss, low-crosstalk waveguide crossing, which is particularly useful in the context of fabricating low-loss, low-crosstalk photonic switch fabrics.

It is noted that the intermediate optical layers (light-transferring interlayer transitions) are very close to each other to enable light to couple from one layer to the next layer. This limits the height of the upper waveguide formed in the second (upper) optical layer 16. A comparably dimensioned conventional crossing would be prone to cross-talk and loss. In contrast, the waveguide crossing disclosed in this specification reduces the unwanted cross-talk and optical loss by virtue of the partially etched rib-and-slab design.

Interlayer transitions may be implemented between two immediately consecutive layers using, for example, adiabatic tapers in which the "source" waveguide is tapered down to a small tip, while in the same span the "target" waveguide is tapered up from a small tip to the desired waveguide width for that layer. An adiabatic taper enables an adiabatic mode transformation across the interlayer transition. For the purposes of this specification, the expression "adiabatic" denotes a lossless modal transition between one mode to another mode, and without any transfer of power to additional modes.

Figure 4:
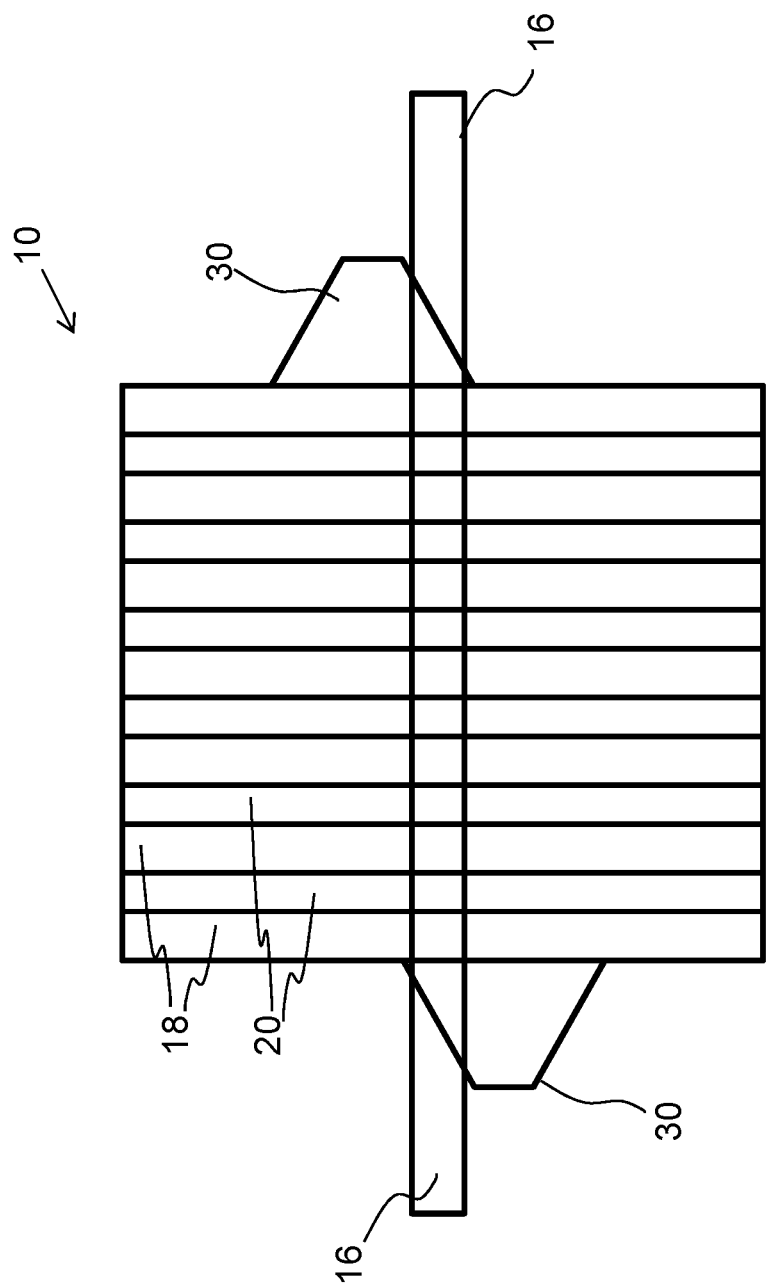
FIG. 4 is a top view of a photonic platform having a sideways taper in accordance with another embodiment.

In the embodiment shown by way of example in FIG. 4, the photonic platform 10 includes trapezoidal tapers 30 disposed asymmetrically relative to the upper waveguide on opposing sides of the slab 18 to reduce the optical loss arising due to the crossing of the upper waveguide of the upper optical layer 16 over the slab 18 and the rib waveguides 20. The shape, size and proportions of the trapezoidal tapers 30 may be varied in other embodiments.

Figure 5:
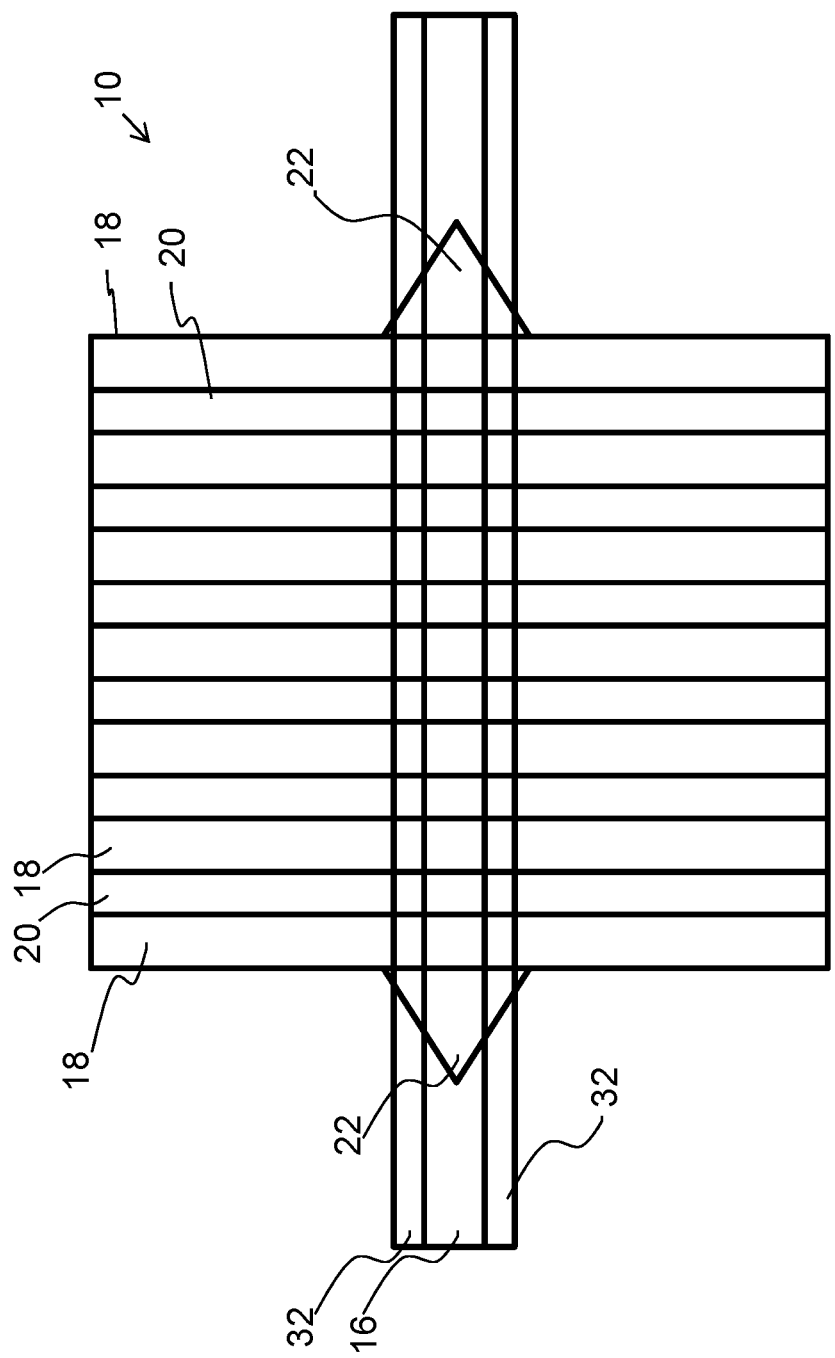
FIG. 5 is a top view of a photonic platform having a partially etched top waveguide.

In the embodiment shown by way of example in FIG. 5, the photonic platform 10 has an upper waveguide of the upper optical layer 16 that is partially etched such that the lateral portions 32 of the waveguide have a smaller thickness than the central portion of the waveguide. This partially etched upper waveguide traverses the slabs 18 and the rib waveguides 20 in a substantially orthogonal manner as illustrated by way of example. The triangular tapered transitions 22 are disposed on opposing sides of the slab 18 in order to reduce optical losses.

Figure 6:
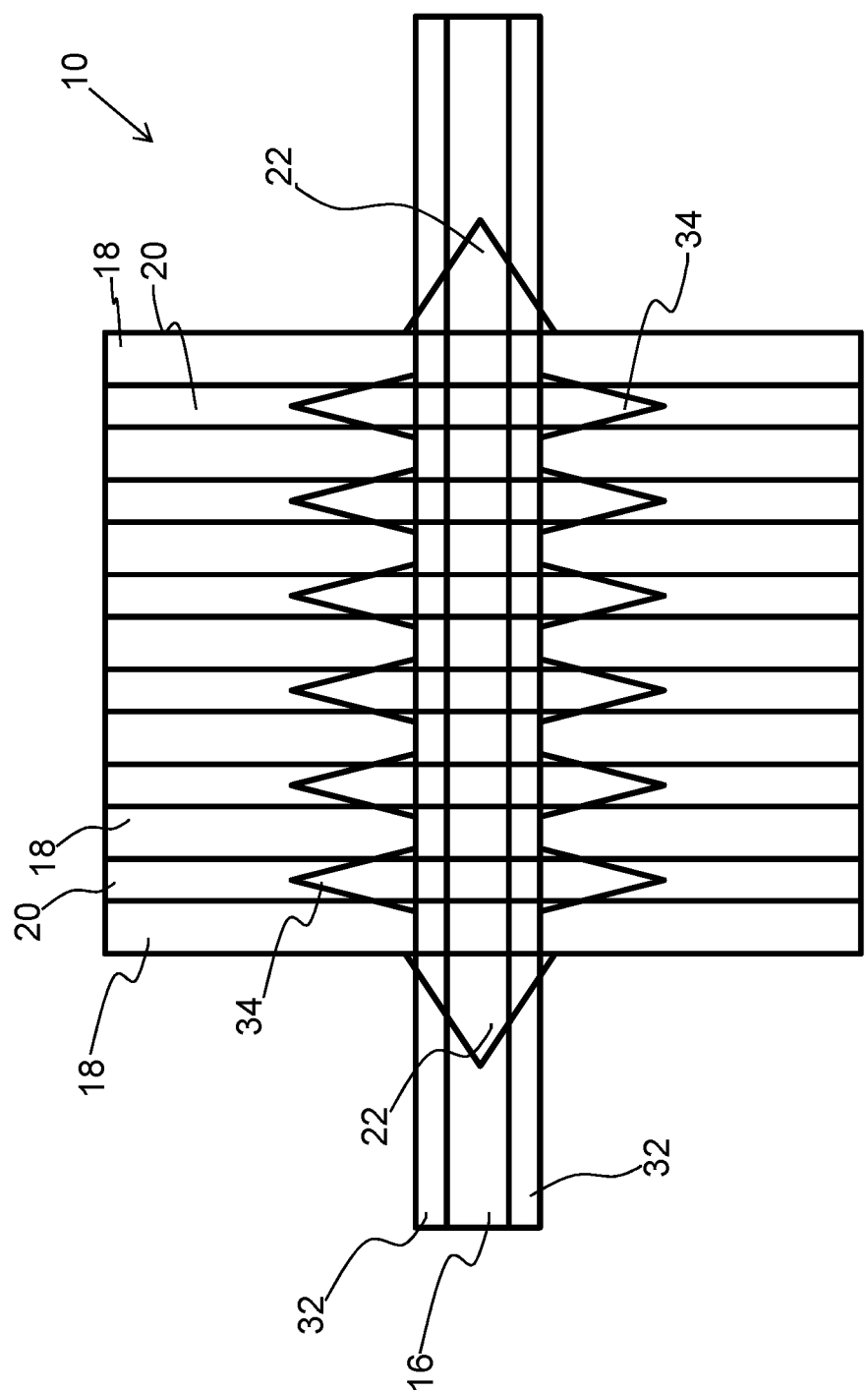
FIG. 6 is a top view of a photonic platform having a partially etched top waveguide and tapered transitions.

In the embodiment shown by way of example in FIG. 6, the photonic platform 10 includes, in addition to the partially etched upper waveguide of the first optical layer 16 (with its thin lateral portions 32), a plurality of orthogonal tapered transitions 34 extending orthogonally from the lateral portions 32 of the upper waveguide. These tapered transitions 34 are substantially aligned with the rib waveguides 20. In the illustrated embodiment, there are two orthogonal tapered transitions 34 for each rib waveguide, which are pointing in opposite directions, and thus twelve tapered transitions for the six rib waveguides shown in this particular example. In the illustrated embodiment, the tapered transitions 34 are triangular but have a different shape than the triangular tapered transitions 22.

The platform 10 may be incorporated into a photonic switch to thereby provide a low-loss, low-crosstalk optical switch.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A photonic platform comprising:
   a substrate;
   a buried oxide layer on the substrate;
   a first optical layer on the buried oxide layer, the first optical layer disposed in a first plane and including a slab and one or more rib waveguides protruding upwardly from the slab; and
   a second optical layer disposed in a second plane spaced above the first plane throughout an entirety of the second optical layer, the second optical layer defining an upper waveguide that crosses over the one or more rib waveguides;
   wherein the first optical layer comprises first and second lateral waveguides disposed on opposite sides of the slab and optically coupled to opposite ends of the upper waveguide.

2. The platform of claim 1 wherein the first optical layer comprises a plurality of substantially parallel rib waveguides.

3. The platform of claim 1 wherein the first optical layer comprises tapered transitions extending under the upper waveguide laterally in opposite directions from the slab.

4. The platform of claim 1 wherein the upper waveguide is partially etched to define lateral portions extending from a central portion of the upper waveguide.

5. The platform of claim 4 wherein the lateral portions comprise tapered transitions aligned with the respective rib waveguides underneath.

6. The platform of claim 3 wherein the tapered transitions are triangular and aligned with the upper waveguide.

7. The platform of claim 3 wherein the tapered transitions are trapezoidal and disposed asymmetrically relative to the upper waveguide.

8. The platform of claim 1 wherein the first optical layer is made of silicon.

9. The platform of claim 1 wherein the second optical layer is made of silicon nitride.

10. A photonic platform comprising:

a substrate;

a buried oxide layer on the substrate;

a first optical layer on the buried oxide layer, the first optical layer disposed in a first plane and including a slab and one or more rib waveguides protruding upwardly from the slab;

a second optical layer disposed on a second plane spaced above the first plane throughout an entirety of the second optical layer, the second optical layer defining an upper waveguide that crosses over the one or more rib waveguides; and an intermediate optical layer between the first and second optical layers, the intermediate optical layer comprising first and second intermediate waveguides for optically coupling the first and second lateral waveguides of the first optical layer to the respective opposite ends of the upper waveguide.

11. A photonic switch comprising:

a lower optical layer disposed in a first plane on a buried oxide layer supported by a substrate, the lower optical layer having one or more lower partially etched waveguides that form one or more rib waveguides on a common slab; and an upper optical layer disposed in a second plane spaced above the first plane throughout an entirety of the upper optical layer and having an upper waveguide that traverses the one or more lower partially etched waveguides;

wherein the lower optical layer comprises first and second lateral waveguides disposed on opposite sides of the slab, the photonic switch further comprising an intermediate optical layer between the lower and upper optical layers, the intermediate optical layer comprising first and second intermediate waveguides for optically coupling the first and second lateral waveguides of the lower optical layer to respective opposite ends of the upper waveguide.

12. The switch of claim 11 wherein the lower optical layer comprises a plurality of parallel rib waveguides that are substantially orthogonal to the upper waveguide.

13. The switch of claim 12 wherein the lower optical layer comprises tapered transitions extending laterally from the slab under the upper waveguide.

14. A photonic waveguide crossing comprising:

a lower optical layer disposed in a first plane and in which is formed a lower rib waveguide; and an upper optical layer disposed in a second plane in which is formed an upper waveguide traversing the lower waveguide, the second plane being spaced above the first plane throughout an entirety of the upper optical layer;

wherein the lower optical layer comprises first and second lateral waveguides disposed on opposite sides of the lower waveguide, the waveguide crossing further comprising an intermediate optical layer between the lower and upper optical layers, the intermediate optical layer comprising first and second intermediate waveguides disposed and configured for optically coupling the first and second lateral waveguides to respective opposite ends of the upper waveguide.

15. The waveguide crossing of claim 14 wherein the lower optical layer comprises a plurality of lower rib waveguides that are substantially orthogonal to the upper waveguide, wherein the lower optical layer comprises laterally extending tapered transitions aligned with the upper waveguide.

16. The waveguide crossing of claim 15 wherein the lower optical layer is silicon and the upper optical layer is silicon nitride.

17. The waveguide crossing of claim 14 wherein the upper waveguide is partially etched.

18. The waveguide crossing of claim 16 wherein the upper waveguide comprises tapered transitions aligned with the lower waveguide.

* * * * *